(12) United States Patent
Posa et al.

(10) Patent No.: US 10,063,848 B2
(45) Date of Patent: Aug. 28, 2018

(54) PERSPECTIVE ALTERING DISPLAY SYSTEM

(76) Inventors: John G. Posa, Ann Arbor, MI (US);
Barry H. Schwab, West Bloomfield, MI (US)

( * ) Notice: Subject to any disclaimer, the term of this patent is extended or adjusted under 35 U.S.C. 154(b) by 2128 days.

(21) Appl. No.: 12/197,635

(22) Filed: Aug. 25, 2008

(65) Prior Publication Data
US 2009/0051699 A1 Feb. 26, 2009

Related U.S. Application Data

(60) Provisional application No. 60/957,845, filed on Aug. 24, 2007.

(51) Int. Cl.
| | | |
|---|---|---|
| *H04N 21/442* | (2011.01) | |
| *G09G 5/00* | (2006.01) | |
| *H04N 13/04* | (2006.01) | |
| *H04N 13/02* | (2006.01) | |
| *H04N 21/422* | (2011.01) | |

(Continued)

(52) U.S. Cl.
CPC ..... *H04N 13/0468* (2013.01); *H04N 13/0278* (2013.01); *H04N 13/047* (2013.01); *H04N 13/0475* (2013.01); *H04N 21/4223* (2013.01); *H04N 21/42202* (2013.01); *H04N 21/431* (2013.01); *H04N 21/44218* (2013.01); *G09G 2340/10* (2013.01); *G09G 2340/12* (2013.01);
(Continued)

(58) Field of Classification Search
CPC .......... H04N 13/0468; H04N 13/0278; H04N 13/047; H04N 13/0475; H04N 21/4223; H04N 21/42202; H04N 21/431; H04N 21/44218; H04N 2213/006; H04N 2005/4428; H04N 5/23296; H04N 7/14; G06F 3/0418; G06F 3/013; G06F 3/017; G09G 2340/10; G09G 2340/12; G09G 2340/125; G06T 3/0006; G06T 15/20; G06T 19/003; G06T 7/004
USPC ....... 345/427, 156, 660, 647–648, 672, 619, 345/629, 680, 682; 348/46, 51, 14.07, 348/563, 578, 583; 715/719
See application file for complete search history.

(56) References Cited

U.S. PATENT DOCUMENTS

| | | |
|---|---|---|
| 2,815,310 A | 12/1957 | Anderson |
| 3,463,581 A | 8/1969 | Clay |

(Continued)

*Primary Examiner* — Chante Harrison
(74) *Attorney, Agent, or Firm* — John G. Posa; Belzer PC

(57) ABSTRACT

The perception of a displayed image is altered for viewers moving relative to the position of the display system screen, thereby imparting a sense of three-dimensional immersion in the scene being displayed. A display generator generates a scene having foreground and background elements, and a display screen displaying the scene. A sensor detects the position of a viewer relative to the display screen, and a processor is operative to shift the relative position of the foreground and background elements in the displayed scene as a function of viewer position, such that the viewer's perspective of the scene changes as the viewer moves relative to the display screen. The foreground and background elements may be presented in the form of multiple superimposed graphics planes, and/or a camera may be used to record the scene through panning at sequential angles. The system may be used to implement virtual windows, virtual mirrors and other effects without requiring viewers or users to modify behavior or wear glasses, beacons, etc.

23 Claims, 10 Drawing Sheets

(51) Int. Cl.
*H04N 21/4223* (2011.01)
*H04N 21/431* (2011.01)
*H04N 5/44* (2011.01)

(52) U.S. Cl.
CPC ............. *G09G 2340/125* (2013.01); *H04N 2005/4428* (2013.01); *H04N 2213/006* (2013.01)

(56) References Cited

U.S. PATENT DOCUMENTS

| | | | |
|---|---|---|---|
| 4,135,502 A | | 1/1979 | Peck |
| 4,896,210 A | | 1/1990 | Brokenshire et al. |
| 4,956,705 A | | 9/1990 | Wright |
| 4,987,487 A | | 1/1991 | Ichinose et al. |
| 5,083,199 A | | 1/1992 | Borner |
| 5,101,268 A | | 3/1992 | Ohba |
| 5,253,051 A | | 10/1993 | McManigal |
| 5,543,964 A | | 8/1996 | Taylor et al. |
| 5,574,836 A | * | 11/1996 | Broemmelsiek ........ G06F 3/012 345/427 |
| 5,589,980 A | | 12/1996 | Bass et al. |
| 5,613,048 A | | 3/1997 | Chen et al. |
| 5,841,439 A | * | 11/1998 | Pose ................... G06T 15/005 345/418 |
| 5,956,180 A | | 9/1999 | Bass et al. |
| 5,963,303 A | | 10/1999 | Allen |
| 6,005,967 A | | 12/1999 | Nakagawa et al. |
| 6,317,151 B1 | | 11/2001 | Ohsuga et al. |
| 6,654,019 B2 | | 11/2003 | Gilbert et al. |
| 6,867,775 B2 | * | 3/2005 | Buck et al. .................. 345/427 |
| 7,079,706 B2 | | 7/2006 | Peterson |
| 7,513,623 B2 | * | 4/2009 | Thomas ........................ 353/7 |
| 7,557,824 B2 | | 7/2009 | Holliman |
| 7,663,689 B2 | * | 2/2010 | Marks .......................... 348/370 |
| 8,704,879 B1 | * | 4/2014 | Cheng ................ H04N 13/0278 348/51 |
| 2002/0113791 A1 | * | 8/2002 | Li ........................ G06T 15/20 345/427 |
| 2003/0035001 A1 | * | 2/2003 | Van Geest ........ H04N 13/0468 715/753 |
| 2003/0080937 A1 | * | 5/2003 | Light ........................ 345/156 |
| 2005/0059488 A1 | * | 3/2005 | Larsen et al. .................. 463/36 |
| 2007/0060346 A1 | | 3/2007 | Edwards |
| 2007/0291035 A1 | * | 12/2007 | Vesely et al. ................ 345/427 |
| 2010/0039380 A1 | * | 2/2010 | Lanier ........................ 345/156 |
| 2010/0053310 A1 | | 3/2010 | Maxson et al. |
| 2011/0234584 A1 | * | 9/2011 | Endo ................... G02B 27/017 345/419 |
| 2014/0118509 A1 | * | 5/2014 | Kroon ................ H04N 13/0011 348/51 |
| 2015/0085076 A1 | * | 3/2015 | Lockhart ............ H04N 13/0468 348/46 |
| 2015/0130799 A1 | * | 5/2015 | Holzer ................ G06F 3/04842 345/420 |

\* cited by examiner

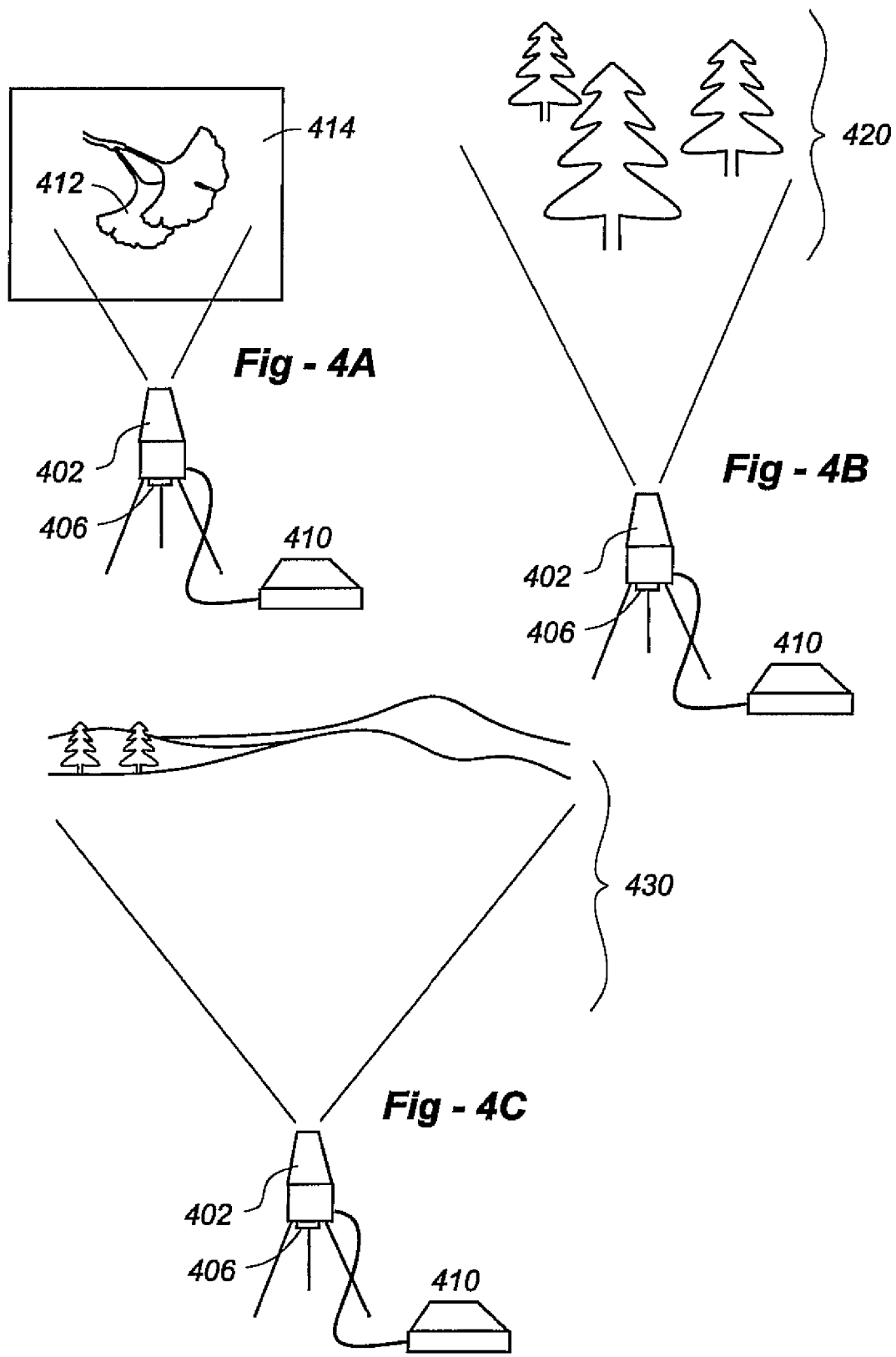

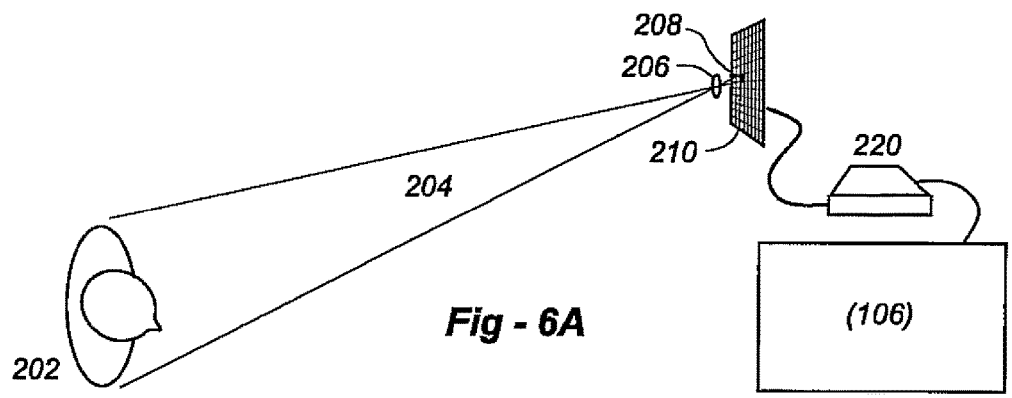
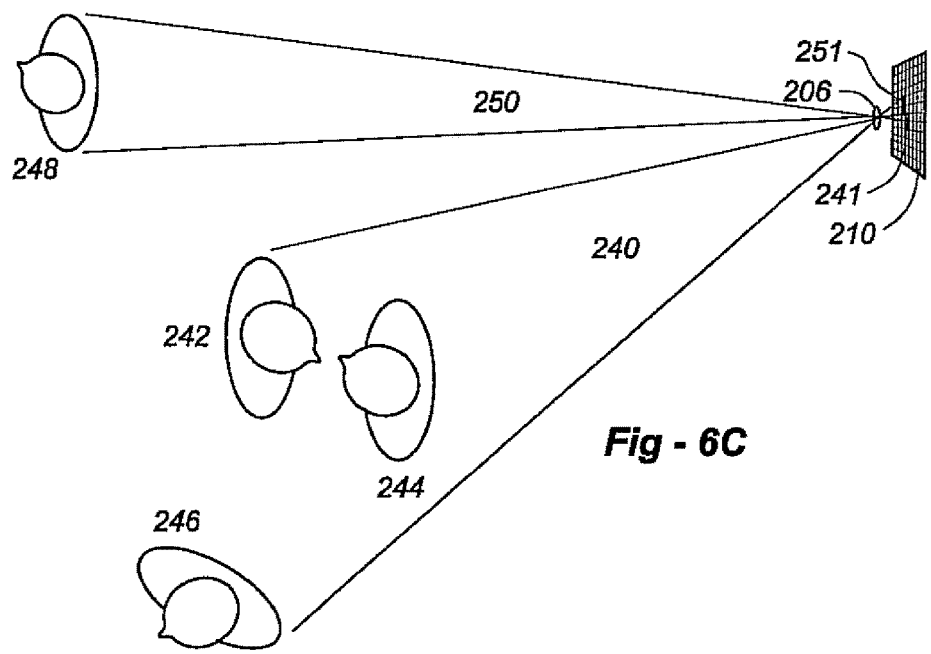

PERSPECTIVE ALTERING DISPLAY SYSTEM

REFERENCE TO RELATED APPLICATION

This application claims priority from U.S. Provisional Patent Application Ser. No. 60/957,845, filed Aug. 24, 2007, the entire content of which is incorporated herein by reference.

FIELD OF THE INVENTION

This invention relates generally to display systems and, more particularly, to systems that alter perspective, synthesize depth perception and provide other capabilities, thereby enhancing the viewing experience.

BACKGROUND OF THE INVENTION

Flat panel displays are growing in size and falling in price. At this time, non-projection, true HD (i.e.—1080 p) 50" displays are available in the $1,000 to $2,000 price range, and new models are introduced on a regular basis. When edge-lit liquid-crystal display (LCD) panels are replaced with back-lit white light-emitting diodes, another leap in technology will occur. When organic LED panels become viable, flexible, affordable wall-sized displays, including wrap-around configurations, should be possible.

As large displays proliferate, users are finding uses for them beyond just "watching TV." In some cases, for example, users are displaying pictures or rotating sequences of pictures on these displays, thereby creating, in effect, large picture frames. However, existing systems for video display are restricted either in their utility or in their realism, due to the inherent limitations in a two-dimensional presentation unit. Of these, the most important impact to the perception of a scene may be its lack of visual perspective as the viewer changes his position relative to the display unit.

The use of 3-D glasses or other paraphernalia is oppressive in those circumstances where a casual effect is desired, or where no user intervention is to be required. Thus, prior-art systems relying on still or even video images, or various photographic or video projection techniques, cannot achieve the level of perception of reality that is desired for many residential or commercial display applications.

SUMMARY OF THE INVENTION

This invention resides in apparatus and methods providing a unique experience for the viewer of a display, particularly large wall-mounted panels. In the preferred embodiments, the perception of a displayed image is altered for viewers moving relative to the position of the display system screen, thereby imparting a sense of three-dimensional immersion in the scene being displayed.

A perspective-altering display system according to the invention comprises a display generator for generating a scene having foreground and background elements, and a display screen displaying the scene. A sensor detects the position of a viewer relative to the display screen, and a processor is operative to shift the relative position of the foreground and background elements in the displayed scene as a function of viewer position, such that the viewer's perspective of the scene changes as the viewer moves relative to the display screen.

The foreground and background elements may be presented in the form of multiple superimposed graphics planes. At least one of the graphics planes may include prerecorded material or material received through a transmission medium or camera. A camera may be used to record the scene through panning at sequential angles, with a memory being used to store the images obtained at the sequential angles for later recall as a function of user movement. An interpolator may be used to "fill in" visual gaps in the scene.

The display screen may be mounted on a wall having a backside, and a camera may be mounted on the backside of the wall which pans as a viewer moves, thereby imaging a scene representative of the display being a virtual window through the wall. A camera with a zoom capability may be used for recording the scene. With the sensor being operative to detect the viewer's distance from the display screen, the processor is further operative to zoom in the camera as the viewer moves closer to the display screen, and zoom out the camera as the viewer moves away from the display screen.

The sensor may be operative to detect the viewer's distance from the display screen, with the processor being operative to increase the resolution of the scene as the viewer moves closer to the display screen and decrease the resolution of the scene as the viewer moves away from the display screen. A camera with a tilt capability may be used for recording the scene, with the processor being further operative to tilt the camera in response to the viewer's up/down movement. The camera may have a field of view which includes a viewer of the display screen, enabling the display to function a virtual mirror.

A plurality of cameras may be used for capturing the scene, with the processor being further operative to construct a three-dimensional image for display on the screen. A user control may be provided enabling a viewer to select a specific camera or cameras to see how others would view the user from different perspectives.

The sensor may include an infrared CCD (charge-coupled device) camera. Regardless, the camera may have an image sensor, such that an image of a person in front of the display may be focused onto the image sensor as a spot or group of pixels, allowing the movements of the person to be tracked with no moving parts.

The sensor may be a camera having at least a pan mount that tracks the movement of a viewer, with the processor being operative to shift the relative position of the foreground and background elements as a function of the tracking. The sensor may be a camera having at least a pan/tilt mount that tracks the movement of a viewer, with the processor being operative to shift the relative position of the foreground and background elements as a function of the tracking. The sensor may be a camera having an auto-focus capability.

The sensor may be operative to sense a plurality of individuals in front of the display screen. The processor may be operative to shift the relative position of the foreground and background elements by favoring larger clusters of individuals as opposed to smaller clusters or single individuals. Alternatively, moving individuals may be favored over stationary individuals, or individuals actually looking at the display screen may be favored over those who are not.

One or more transducers may be provided for producing sounds associated with the scene, with the processor operative to alter the reproduction of the sounds as a function of viewer movement.

BRIEF DESCRIPTION OF THE DRAWINGS

FIG. 4A depicts the image of a foreground object being gathered by a camera and recorded by a recorder;

FIG. 4B shows mid-range objects being recorded;

FIG. 4C shows distant or background objects are being recorded;

FIG. 6A shows how an infrared CCD (charge-coupled device) camera, preferably with a wide-angle lens, may be used as a sensor according to the invention;

FIG. 6C depicts three persons generating a composite thermal field on an image sensor;

DETAILED DESCRIPTION OF THE INVENTION

This invention employs a variety of techniques to provide a unique experience for the viewer of a display, particularly large wall-mounted panels. In the preferred embodiments, the perception of a displayed image is altered for viewers moving relative to the position of the display system screen, thereby imparting a sense of three-dimensional immersion in the scene being displayed.

Figure 1A:
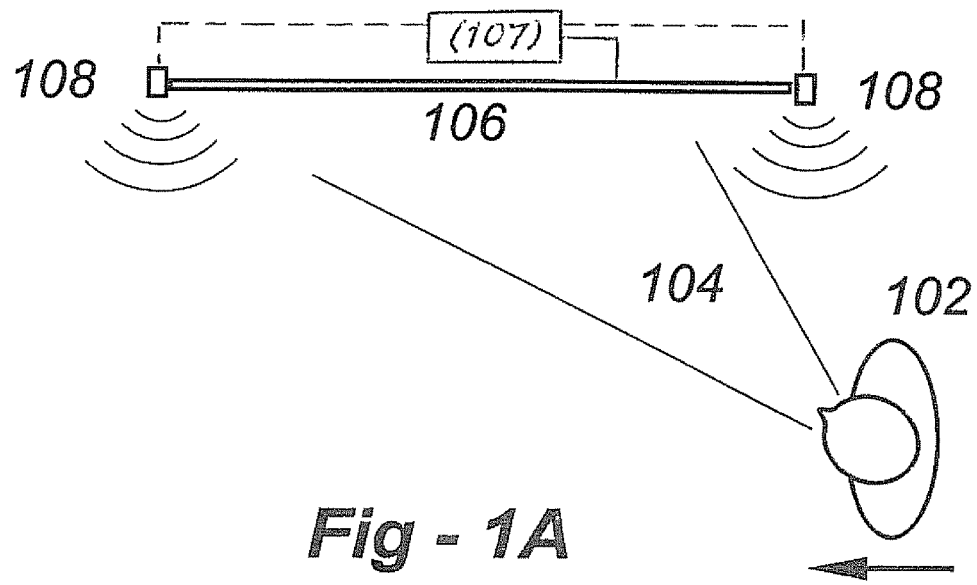
FIG. 1A shows a viewer having a field of view walking from the right towards the left relative to a display screen (shown as viewed from above)

FIG. 1A shows a viewer 102 having a field of view 104 walking from the right towards the left relative to a display screen 106 driven by display generator 107. One or more sensors 108, which may use visible-light, infrared, ultrasonic, or other modalities described in further detail below, are used to track at least the lateral position of individual 102.

Figure 1B:
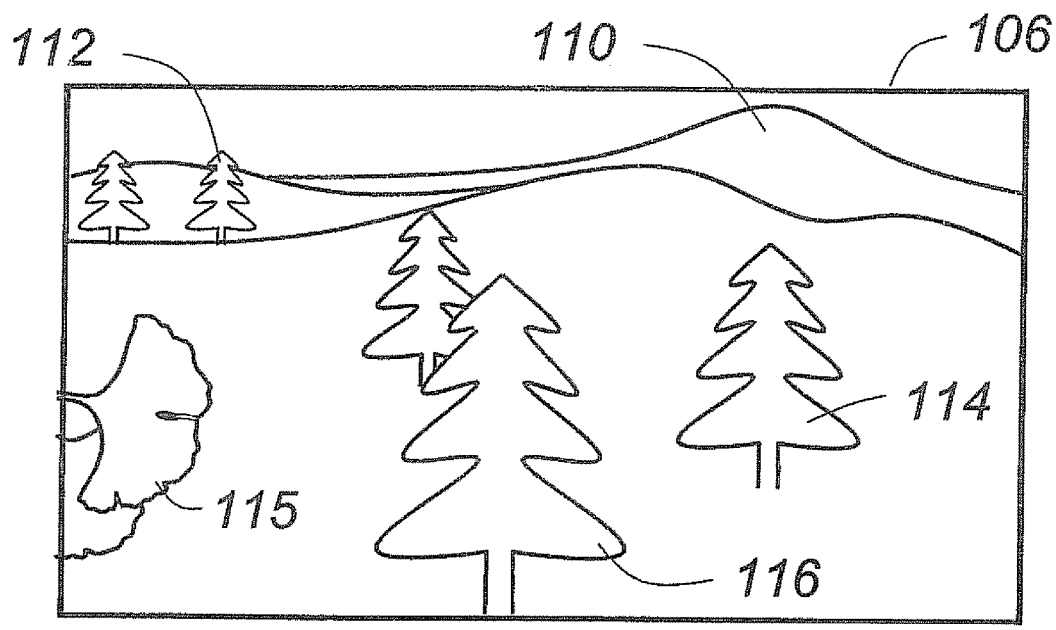
FIG. 1B is a simplified representation of what the person might see on the display screen according to the invention from the position shown in FIG. 1A.

FIG. 1B is a simplified representation of what the person 102 might see on the display screen 106 according to the invention from the position shown in FIG. 1A. Relatively close objects are shown at 115, 116. Less close objects are seen at 114. Somewhat distant objects are shown at 112, and distant objects are shown at 110. Although four relative distances are mentioned, the invention is not limited in this regard, and is applicable to more or fewer such relative distances.

Figure 2A:
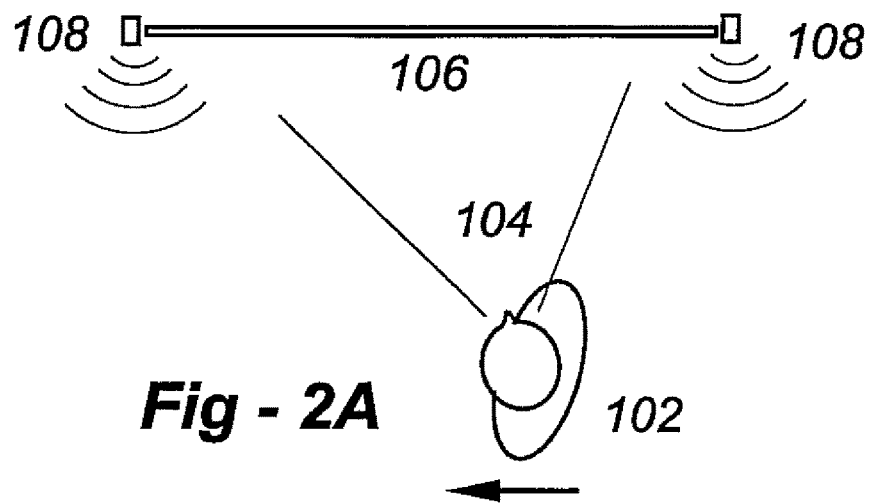
FIG. 2A shows the person moving to the left, closer to the center of the display screen.
Figure 2B:
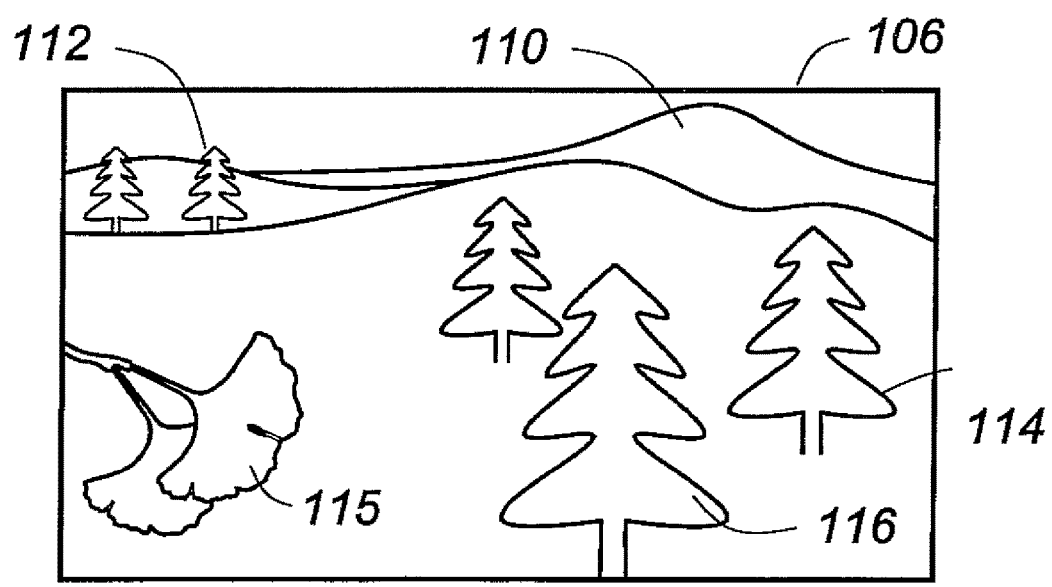
FIG. 2B shows how closer objects have shifted laterally to the greatest degree, as opposed to more distant objects, much as a train passenger would experience while looking out the window of the train as the train moves.

In FIG. 2A, the person 102 has moved to the left, closer to the center of the screen 106. The sensor(s) 108 have detected this movement and, in response, the perspective of the scene has been altered. As shown in FIG. 2B, closer objects have shifted laterally to the greatest degree, followed by objects 114 and 112 in order, much as a train passenger would experience while looking out the window of the train as the train moves. Object 110, being significantly distant, would shift little, if at all.

Figure 3A:
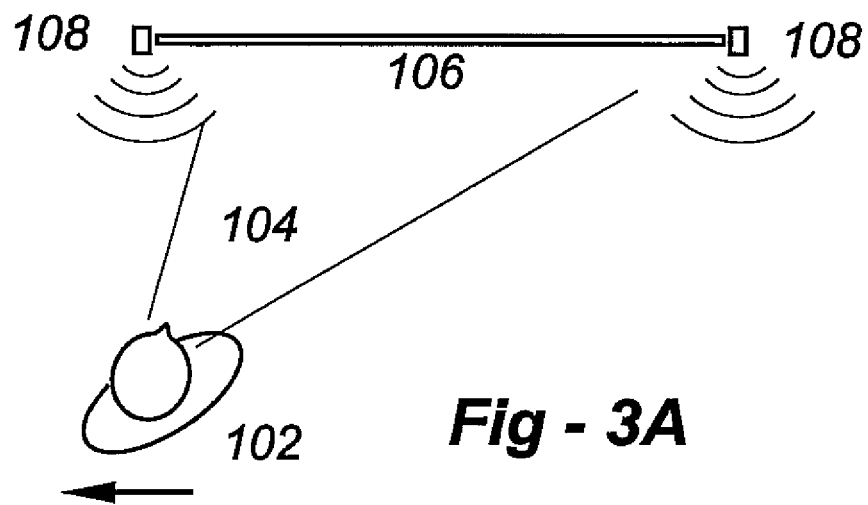
FIG. 3A illustrates how the viewer has moved to the left-most portion of the display.
Figure 3B:
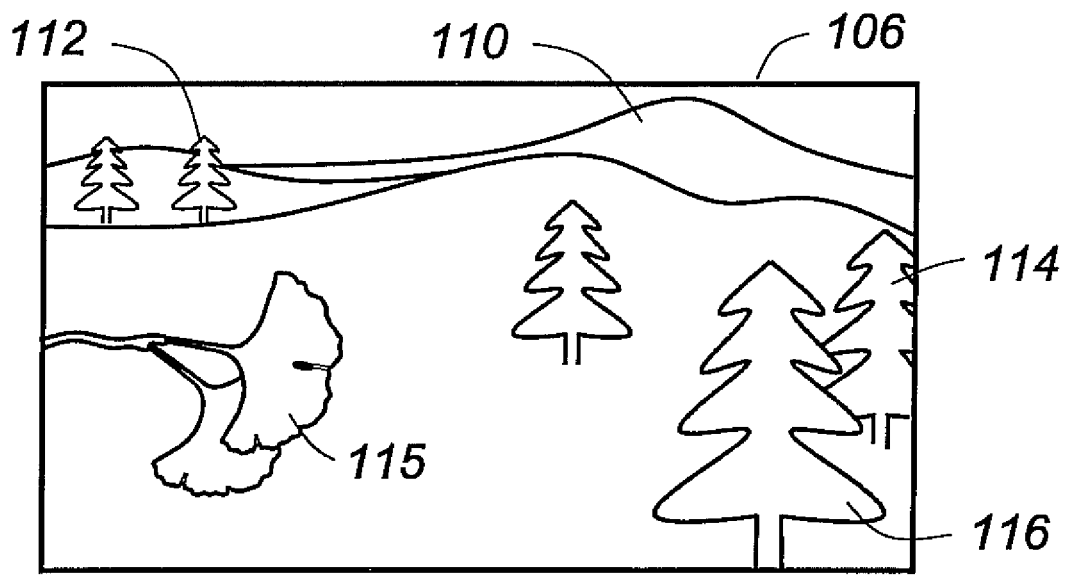
FIG. 3B shows how close objects have shifted to the extent that they now partially overlap with an object further away.

This process continues in FIG. 3A, where the viewer has moved to the left-most portion of the display. Close object 116 has shifted to the extent that it now partially overlaps with an object further away, and object 115 has begun to move off the screen 106, as shown in FIG. 3B. The ways in which the invention makes this possible will now be described in further detail.

In the preferred embodiment, the invention employs a technique similar to that utilized in animation films: multiple superimposed graphics planes. In FIG. 4A, the image of a foreground object 412 is gathered by camera 402 and recorded by recorder 410. Depending upon the circumstances, a blue or other solid-color background 414 may be used for chroma-keying.

In FIG. 4B, mid range objects 420 are being recorded whereas, in FIG. 4C, distant or background objects are being recorded. Commercially available software packages, or customized software tuned to specific program content, can be utilized to derive the desired material from among multiple subjects representing different focal points, and, once identified, can track the subjects as they change their position and even their orientation. In an alternative approach, multiple cameras, positioned to capture three-dimensional information, may be utilized to derive a three-dimensional array for each frame of motion, thereby allowing the producer to select "slices" which can be captured as graphics plane images for manipulation by the graphics processor of the instant invention.

The camera(s) may record moving video images for the foreground graphics plane(s), the background graphics plane(s), or any combination thereof. For example, the background graphic plane may be based upon a still picture, while the foreground cameras record motion imagery. In this embodiment, position sensor(s) 108 detect the location of the viewer relative to the screen, and reposition the foreground graphics plane(s) as the viewer moves, thereby conveying to the viewer the impression, for example, that he is looking through a window at an outdoor scene, with, perhaps, a nearer image, such as a tree branch, that the viewer can see around by simply shifting his position relative to the display screen. The tree branch (or other object) may also be moving, as it would in a breeze, for example.

The video source for these graphics planes may include prerecorded material supplied by playback from any recording devices. Other sources include broadcast, satellite, cable, or other programming sources, material delivered over broadband or other telecommunication links, privately recorded material, live video from cameras (including security and monitoring cameras), computer-generated graphics and the like, or any other source of image material. Graphics planes displaying text information may be superimposed over, or under, other graphics planes.

Figure 5:
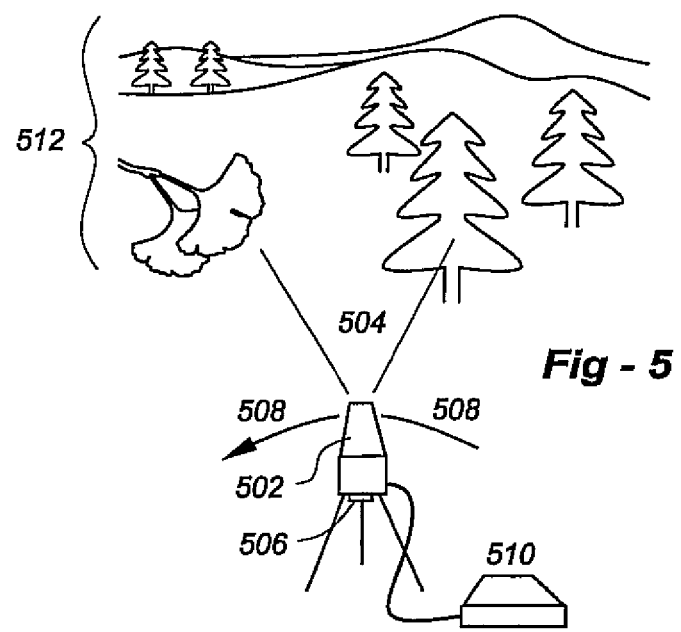
FIG. 5 depicts an alternative technique for implementing perspective alteration according to the invention.

FIG. 5 depicts an alternative technique for implementing perspective alteration according to the invention. Here a camera 502 having at least a pan mount 506 records an actual scene 512 at incremental angles suggested by arrow 508. The view at each angle is recorded by unit 510 for later replay. The number of increments depends upon the desired resolution, room dimensions, and other factors. For example, at a very high resolution, single-degree increments may be recorded through a full 180 degrees. At a lesser resolution, single-degree increments may be recorded across a smaller angle of view, or larger-degree increments may be used at angle of view with or without interpolation to fill in any 'gaps' during replay.

Thus, a variety of novel video applications are enabled by virtue of the invention, such as a simulated window which has a view that is not possible from that position if there were an actual window in that position (i.e., viewing a sunset from an eastern exposure), or a view which is not possible at all (i.e., a winter scene during the summer, or a scene from a different country). These represent a clear improvement over any of the typical "light box" with photographic transparency or other attempt to simulate a window view with conventional means.

Figure 7A:
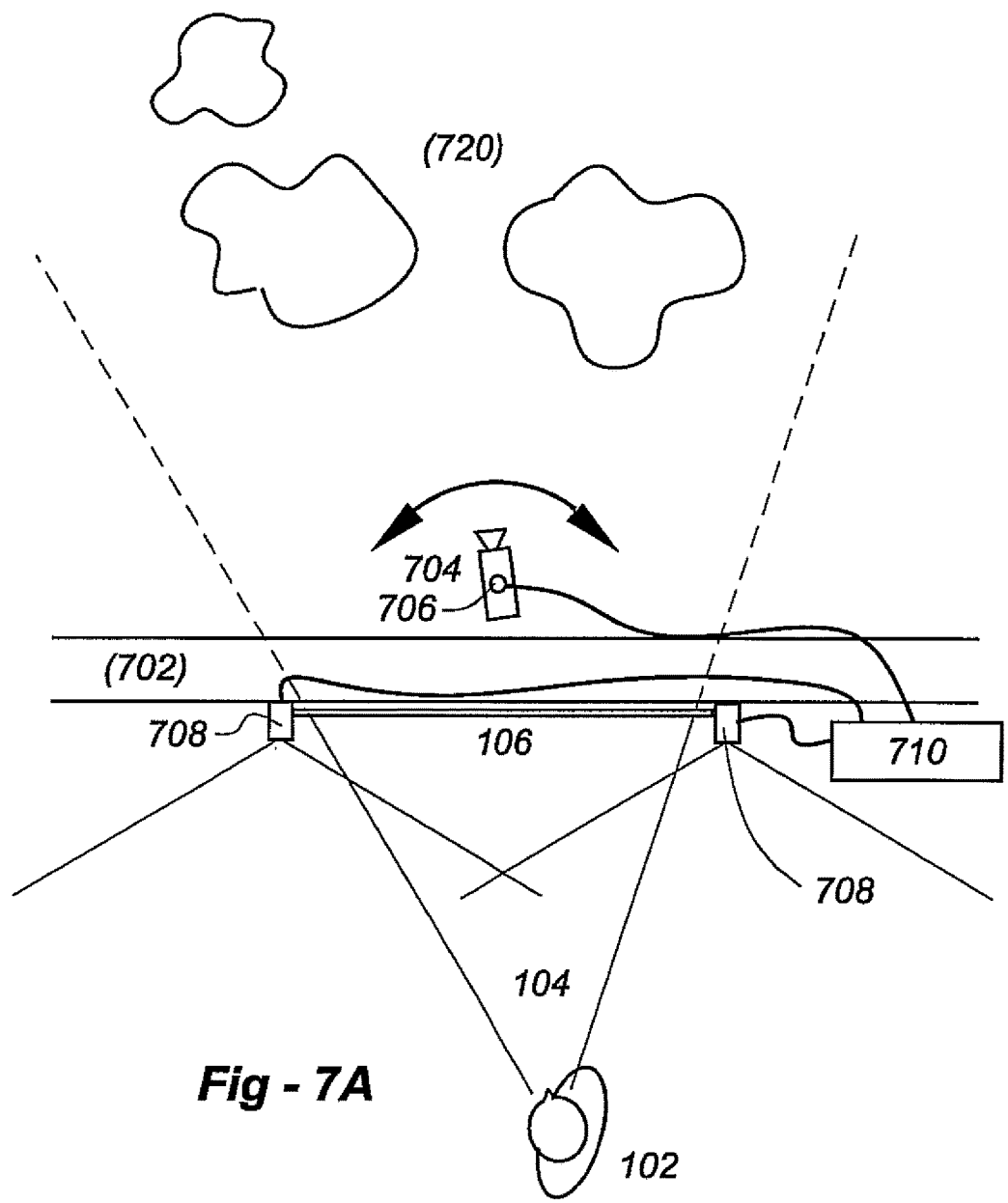
FIG. 7A illustrates a "virtual picture window" embodiment, wherein the movement of a viewer causes an outdoor camera to pan back/forth, thereby allowing the viewer to visualize the outdoor scene as if the display were a hole in the wall.

FIG. 7A illustrates a "virtual picture window" embodiment, wherein the movement of viewer 102, detected by sensors 108, cause outdoor camera 704 on mount 706 to pan back/forth, thereby allowing the viewer 102 to "see" the outdoor scene 720 "through" the wall 702 on display 106 using graphics processing system 710. Depending upon the movement of the viewer toward/away from the screen 106, in this and other applicable embodiments the camera 704 may zoom as the viewer comes closer, pan when the user moves away and tilt if the viewer goes up/down, as might be the case on a staircase, for example.

Through the use of distance detection, the display system can provide a three-dimensional effect, by applying modifications to an image as the viewer changes his position. Thus, for example, an image of a painting might capture the artist's intentions when viewed at a distance, while a close-up examination of the video display by the viewer could display the details of the brush strokes as the viewer changed his position relative to the screen.

Figure 7B:
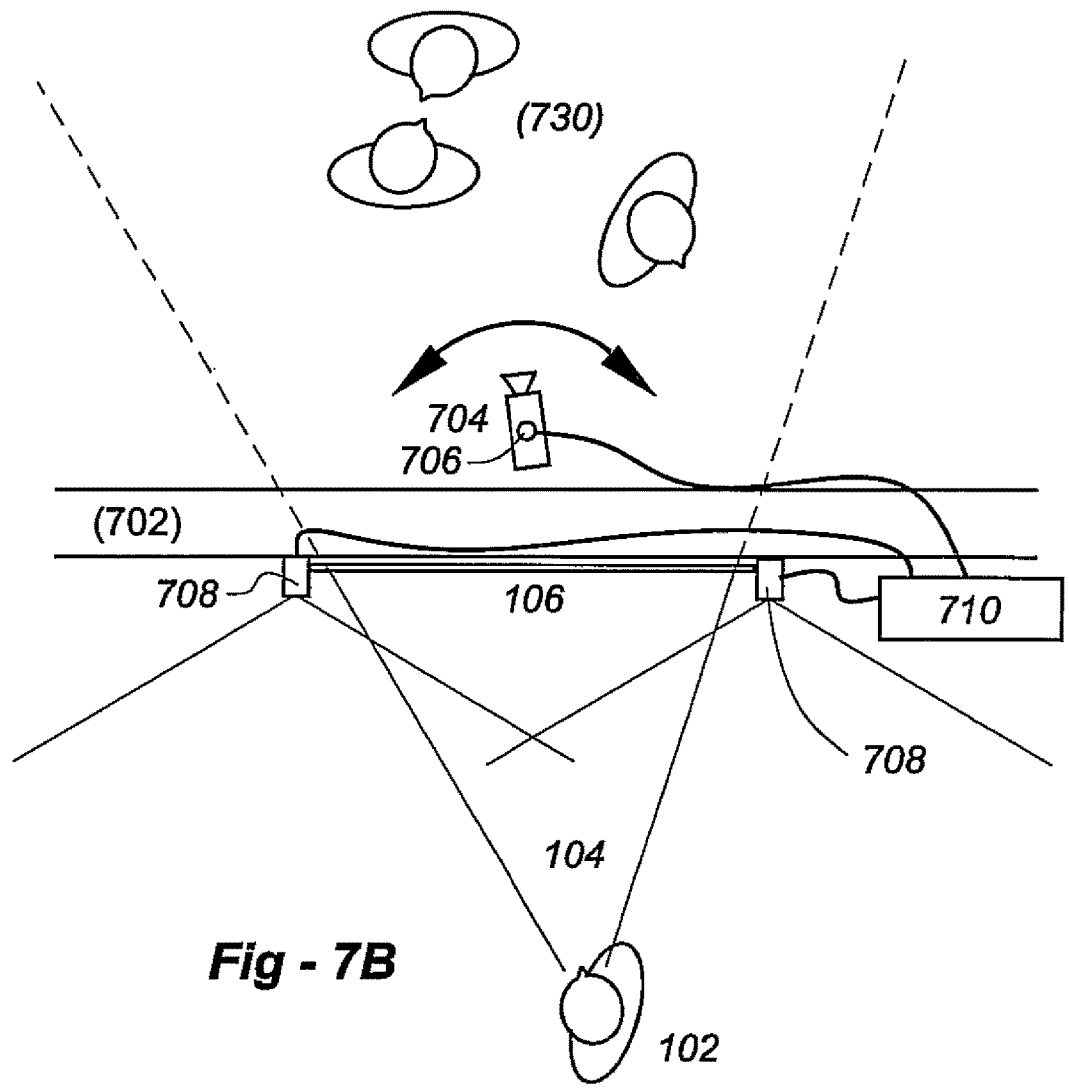
FIG. 7B shows how the invention enables virtual windows on insides walls, which may be useful in homes and businesses such as restaurants, bars and nightclubs.

The invention is not limited to virtual windows through outside walls. As shown in FIG. 7B, the invention enables virtual windows on insides walls, which may be useful in homes and businesses such as restaurants, bars and nightclubs. Similar to the embodiment depicted in FIG. 7A, as user 102 moves relative to screen 106, camera 704 pans (or tilts or zooms), enabling the user 102 to see people 730 or other objects through the wall 702.

Figure 7C:
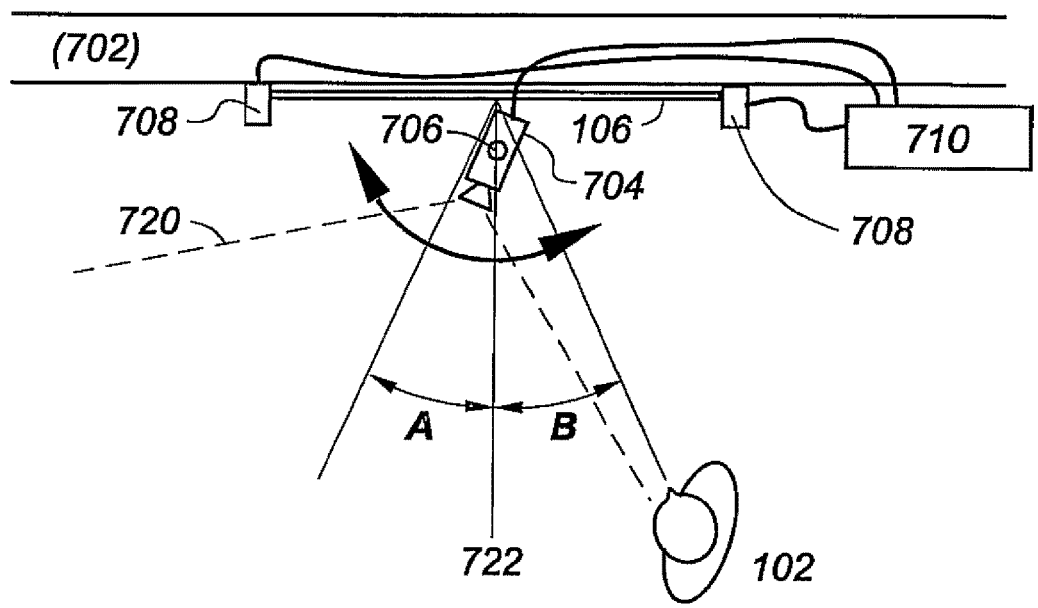
FIG. 7C shows how the display can function as a "virtual mirror"

In still another aspect, the display system can function as a "virtual mirror." Such an embodiment is depicted in FIG. 7C, wherein graphics processing system 710 directs the camera 704 to at least pan at an angle "A" substantially equal to angle "B" formed by the location of the user and line 722 perpendicular to the plane of display 106. This allows the viewer to see a synthesized reflection depicted by broken line 720, typically including the subject him/herself.

Figure 8:
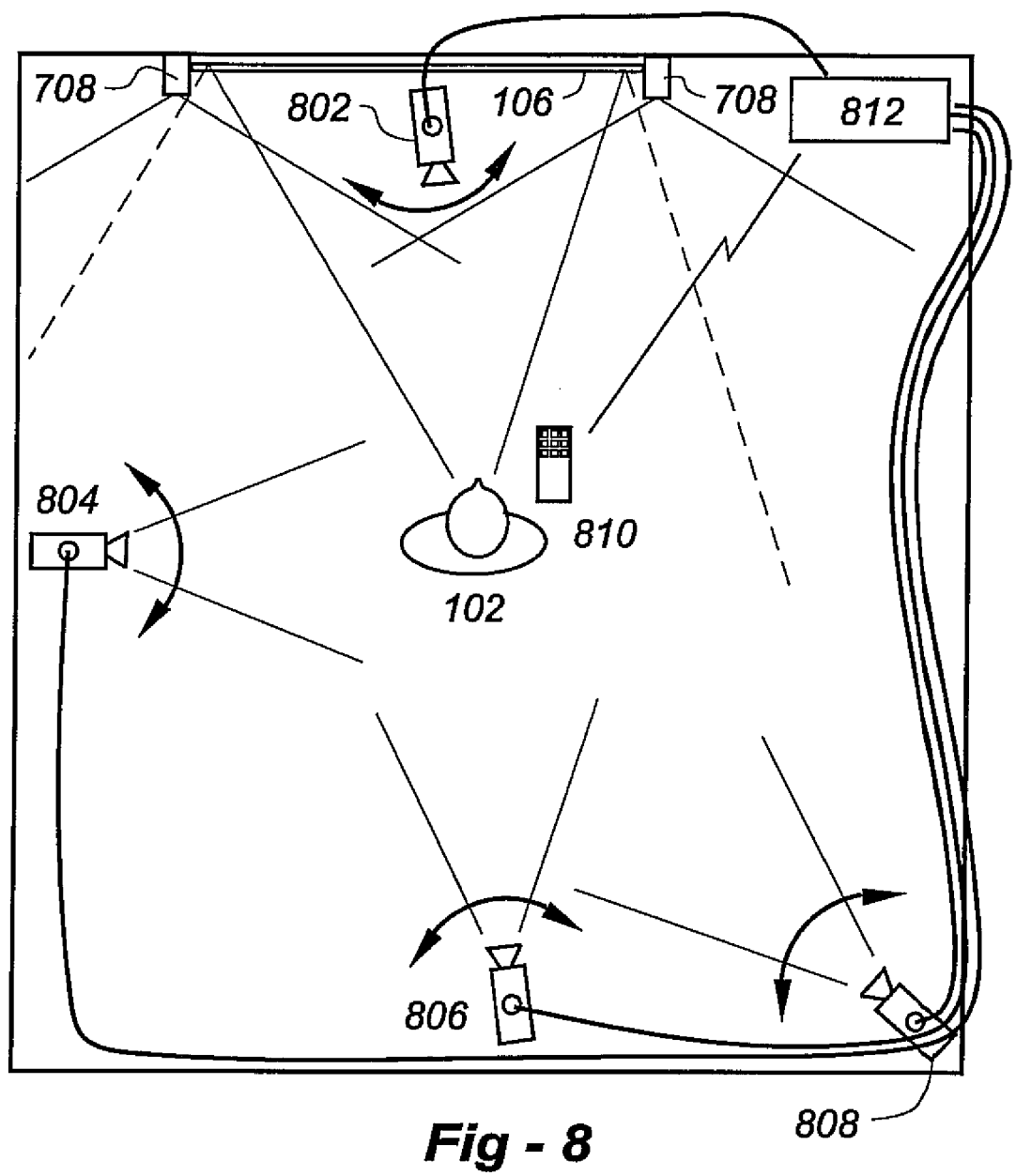
FIG. 8 depicts how the virtual mirror embodiment of the invention may be used in bathrooms and dressing rooms.

The mirror embodiment of the invention may be used in bathrooms and dressing rooms, as illustrated in FIG. 8. Multiple cameras 802, 804, 806, 808 disposed around the display screen 106 allow the processor unit 812 to construct a three-dimensional image for display on the screen, and the proximity sensing devices may be utilized to create an on-screen image which is representative of what a person should see as he re-positions himself, in three dimensions, about the display screen. It is a simple matter to provide a left-to-right reversed-image, in keeping with the mirror aspect of the invention. A user control 810 allows the user to select a specific camera or cameras to see how others would view them from different perspectives.

In the dressing room/bathroom embodiments of the invention, the camera(s) capturing the image of the viewer may be placed behind a semi-transparent screen allowing better visualization such as eye-level contact to be maintained. One or more video cameras may be provided on a bendable tether—or wireless hookup—enabling a user to view hard-to-reach places such as cars, nose, mouth etc. Variable degrees of magnification may be provided, based upon detected distance from a surface being viewed, for example.

In terms of position sensing, the preferred embodiment uses an infrared CCD (charge-coupled device) camera, preferably with a wide-angle lens 206 shown in FIG. 6A. The user 202 generates a thermal image 204, which is focused onto camera array 210 as a spot or group of pixels, allowing the system 220 to know where a person is with no moving parts. Processor 106 can then cause the perspective, depth perception, or other characteristics to change accordingly. If no tilt or zoom functions are provided, a linear sensor may be substituted for a 2D sensor.

Figure 6B:
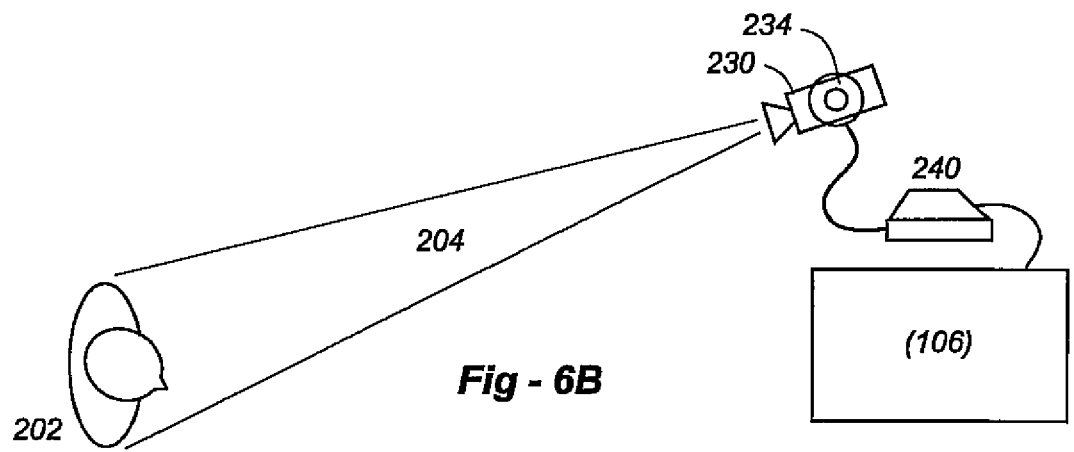
FIG. 6B shows the use of a panning camera.

As an alternative to a fixed camera with sufficiently wide-angle lens, a panning camera may be used, as shown in FIG. 6B. Here the camera 230 is trained on a subject and, as that subject moves positional information is sensed by pan mount 234 and communicated to alter screen 106 through electronics unit 240. Again, if tilt/zoom functions are provided, the camera 230 may use tilt and/or auto focus to determine other positional aspects of the viewer.

The invention may handle multiple viewers in different ways. These solutions include (1) favoring clusters of potential viewers over singular viewers; (2) favoring moving viewers over stationary viewers; and (3) favoring viewers actually looking at the screen over those looking away. One advantage of the sensor system of FIG. 6A is that clustering is naturally accommodated. In FIG. 6C, three persons 242, 244, 246 generate a composite thermal field 240, which generates a relatively large imprint 251 on sensor 210. In contrast, the narrower thermal field 250 of single person 248 results in a smaller spot 241 on array 210 such that, in this embodiment of the invention, the perspective of persons in the group would be favored.

The approach of FIG. 6A also naturally addresses the favoring of moving viewers over stationary viewers. Referring again to FIG. 6C, if the group consisting of persons 242, 244, 246 were stationary, it would be a straightforward processing task to detect that an individual is moving. In this embodiment of the invention, the moving individual 248 would be preferred over the stationary group.

In all embodiments of the invention, sensing in the visible region of the spectrum may be used instead of—or in concert with—IR sensing. This presents advantages and disadvantages. In terms of advantages, visible light sensing may allow a single camera (or cameras) to detect the image and position of the viewer (as in the mirror embodiments). Another advantage is that recognition techniques may be used to determine if a particular person is actually looking at the display in which case that person may be favored over individuals looking away. If multiple persons are looking at the display, other techniques such as clustering and motion favoring may also be used. Perhaps the only disadvantage is that image recognition and other operations require additional processing power, however, that is easily accommodated with modern processors.

In each case, specialized graphics processing provides the management of the graphics planes and any audio material, while processing rules (for example—"take image modification instructions from the position of the closest viewer only") ensure that the system will not be misdirected by movement of viewers that are on the opposite side of the room. Where multiple display systems are in use (as for simulating an array of "structural" windows), an overall system for management of the displays is utilized, thus providing an integrated, coordinated system of imaging displays. For example—an overall image, larger than the entire display system, may be utilized, or alternative schemes, in which image planes or other data may "flow" from one display screen to another display screen next to it.

While described herein with reference to flat-panel displays (LED, LCD, Plasma, etc.) the principles disclosed may be applied with suitable results to any number of display technologies currently available or in development today (CRT-type, front or rear projection, Electroluminescence, OLEDs, etc.). Furthermore, adjustments may be applied to the image data to correct for any geometric distortions introduced due to the position of the camera(s) or display unit(s). In addition, alternative embodiments may utilize additional graphics planes to enhance the effect of the display.

In all cases, audio may be included, representing material that may or may not be related to the video images presented on the screen. Thus, the system can serve the function of an enhanced video display terminal, a television viewing screen, a security monitoring system, a video entertainment system, or any other system for which display of graphics material is of value to the viewer.

With further regard to audio, if the system is provided with stereo or surround sound, the sound reproduction may be altered as a function with user position, with or without a change in visual perspective. For example, as an individual walks past the display screen the sound of elements in the scene (i.e., birds, vehicles, etc.) may be varied whether or not the individual is looking at the screen. If the user moves toward the screen, sounds may be enhanced or attenuated. For example, if a viewer moves toward a frog or a bird in the scene, the sounds of that creature may be enhanced, or diminished as the user moves away.

We claim:

1. A perspective-altering display system, comprising:
a display screen for displaying a scene having opposing side edges;
a sensor for detecting the movement of a viewer relative to the display screen;
at least one memory for storing foreground and background imagery;
wherein the memory has a capacity to store imagery that extends beyond one or both of the side edges of the display screen;
at least one processor interconnected to the memory and the sensor, the processor being operative to perform the following functions:
generate a scene based upon multiple superimposed graphics planes, including a foreground graphics plane containing the foreground imagery and a background graphics plane containing the background imagery, and
receive a signal from the sensor and shift the relative position of the foreground and background graphics planes in the displayed scene as a function of viewer movement;
wherein the multiple superimposed graphics planes include non-visible imagery beyond one of both of the side edges display screen; and
wherein the foreground graphics plane is shifted by way of a translation to a greater extent than the background graphics plane as a viewer moves from side to side relative to the display screen, causing the non-visible imagery to become visible.

2. The display system of claim 1, wherein at least one of the graphics planes includes prerecorded imagery.

3. The display system of claim 1, wherein at least one of the graphics planes includes imagery received through a transmission medium.

4. The display system of claim 1, wherein at least one of the graphics planes includes imagery received from a camera.

5. The display system of claim 1, wherein at least one of the graphics planes includes textual information.

6. The display system of claim 1, further including:
a camera that records the scene through panning at sequential angles; and
wherein the memory stores imagery obtained at the sequential angles for later recall as a function of user movement.

7. The display system of claim 6, further including:
an interpolator for filling in visual gaps in the scene.

8. The display system of claim 1, wherein:
the display screen is mounted on a wall having a backside; and
further including a camera mounted on the backside of the wall which pans as a viewer moves, thereby imaging a scene representative of the display being a virtual window through the wall.

9. The display system of claim 1, further including:
a camera with a zoom capability for recording the scene;
the sensor being operative to detect the viewer's distance from the display screen; and
wherein the processor is further operative to zoom in the camera as the viewer moves closer to the display screen and zoom out the camera as the viewer moves away from the display screen.

10. The display system of claim 1, wherein:
the sensor is operative to detect the viewer's distance from the display screen; and
the processor is operative to increase the resolution of the scene as the viewer moves closer to the display screen and decrease the resolution of the scene as the viewer moves away from the display screen.

11. The display system of claim 1, further including:
a camera with a tilt capability for recording the scene;
the sensor being operative to detect the viewer's up/down movement relative to the display screen; and
wherein the processor is further operative to tilt the camera in response to the viewer's up/down movement.

12. The display system of claim 1, further including:
a camera for recording the scene, the camera having a field of view including a viewer of the display screen; and
wherein the processor is further operative to flip the scene horizontally such that the display functions as a virtual mirror.

13. The display system of claim 1, further including:
a plurality of cameras for recording the scene; and
wherein the processor is further operative to construct a three-dimensional image for display on the screen.

14. The display system of claim 1, further including:
a plurality of cameras for recording the scene;
the processor being further operative to construct a three-dimensional image for display on the screen; and
a user control a viewer to select a specific camera or cameras to see how others would view the user from different perspectives.

15. The display system of claim 1, wherein the sensor is an infrared CCD (charge-coupled device) camera.

16. The display system of claim 1, wherein:
the sensor is a camera having an image sensor; and
an image of a person in front of the display is focused onto the image sensor as a spot or group of pixels, allowing the movements of the person to be tracked with no moving parts.

17. The display system of claim 1, wherein:
the sensor is a camera having at least a pan mount that tracks the movement of a viewer; and
the processor is operative to shift the relative position of the foreground and background elements as a function of the tracking.

18. The display system of claim 1, wherein:
the sensor is a camera having a pan/tilt mount that tracks the movement of a viewer;
the processor is operative to shift the relative position of the foreground and background elements as a function of the tracking.

19. The display system of claim 1, wherein:
the sensor is a camera having an auto-focus capability to track the movement of a viewer;
the processor is operative to shift the relative position of the foreground and background elements as a function of the tracking.

20. The display system of claim 1, wherein:
the sensor is operative to sense a plurality of individuals in front of the display screen; and
the processor is operative to shift the relative position of the foreground and background elements by favoring clusters of individuals.

21. The display system of claim 1, wherein:
the sensor is operative to sense a plurality of individuals in front of the display screen; and
the processor is operative to shift the relative position of the foreground and background elements by favoring moving individuals over stationary individuals.

22. The display system of claim 1, wherein:
the sensor is operative to sense a whether an individual is looking toward the display screen; and
the processor is operative to shift the relative position of the foreground and background elements by favoring individuals looking toward the display screen.

23. The display system of claim 1, further including one or more transducers for producing sounds associated with the scene; and
the processor is operative to alter the reproduction of the sounds as a function of viewer movement.

* * * * *